US009754096B2

(12) United States Patent
Scagnol et al.

(10) Patent No.: US 9,754,096 B2
(45) Date of Patent: Sep. 5, 2017

(54) UPDATE MANAGEMENT (71) Applicant: Qualcomm Technologies International, Ltd., Cambridge (GB)

(72) Inventors: Mauro Scagnol, Cambridge (GB); Srdjan Miocinovic, Los Gatos, CA (US); Hooman Borghei, San Diego, CA (US); Dragan Boscovic, South Barrington, IL (US); Hamid Ahmadi, San Jose, CA (US); Nicolas Guy Albert Graube, Barrington (GB); Robin Heydon, Cottenham (GB); Nicholas John Jones, Cambridge (GB); Clive Thomson, Cottenham (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 242 days.

(21) Appl. No.: 14/505,443

(22) Filed: Oct. 2, 2014

(65) Prior Publication Data
US 2015/0245182 A1 Aug. 27, 2015

(30) Foreign Application Priority Data

Feb. 25, 2014 (GB) .................................. 1403312.0
Feb. 25, 2014 (GB) .................................. 1403314.6
(Continued)

(51) Int. Cl.
*H04W 24/02* (2009.01)
*H04W 84/22* (2009.01)
(Continued)

(52) U.S. Cl.
CPC ......... *G06F 21/44* (2013.01); *G06Q 10/0833* (2013.01); *H04B 7/14* (2013.01);
(Continued)

(58) Field of Classification Search
CPC ..... H04W 24/02; H04W 88/12; H04W 84/22; H04W 24/04; H04W 40/248;
(Continued)

(56) References Cited

U.S. PATENT DOCUMENTS 6,917,974 B1   7/2005  Stytz et al.
6,986,046 B1   1/2006  Tuvell et al.
(Continued)

FOREIGN PATENT DOCUMENTS

CN   102761941 A   10/2012
CN   102984798 A   3/2013
(Continued)

OTHER PUBLICATIONS

Search Report for DE Application 10 2014 012 258.1 mailed on Mar. 2, 2015 (12 pages).
(Continued)

*Primary Examiner* — Redentor Pasia
*Assistant Examiner* — Peter Mak
(74) *Attorney, Agent, or Firm* — Paradice and Li LLP (57) ABSTRACT A method for providing an update package to a node in a mesh network comprising a set of nodes and a gateway node arranged to provide access to an update server via a second network. The gateway node collects package information from each set node, including a first node. Each package identifies a respective node and its package version. The gateway node may query the update server based on the package information. The update server may respond to the gateway node with an updated package for the first node. The gateway node broadcasts the updated package into the mesh network as a sequence of mesh messages. Each of a first plurality of nodes of the set may forward the mesh messages to other nodes. The first node stores the mesh
(Continued)

messages so as the sequence of mesh messages is received, assemble the updated package.

16 Claims, 2 Drawing Sheets

(30) Foreign Application Priority Data

| | | | |
|---|---|---|---|
| Mar. 31, 2014 | (GB) | .................................. | 1405785.5 |
| Mar. 31, 2014 | (GB) | .................................. | 1405786.3 |
| Mar. 31, 2014 | (GB) | .................................. | 1405789.7 |
| Mar. 31, 2014 | (GB) | .................................. | 1405790.5 |
| Mar. 31, 2014 | (GB) | .................................. | 1405791.3 |
| Mar. 31, 2014 | (GB) | .................................. | 1405797.0 |
| Jul. 17, 2014 | (GB) | .................................. | 1412719.5 |

(51) Int. Cl.

| | |
|---|---|
| H04W 72/04 | (2009.01) |
| H04W 88/12 | (2009.01) |
| H04L 12/24 | (2006.01) |
| H04L 12/721 | (2013.01) |
| H04L 29/08 | (2006.01) |
| G06F 21/44 | (2013.01) |
| H04L 12/26 | (2006.01) |
| H04W 40/24 | (2009.01) |
| H04W 84/18 | (2009.01) |
| H04L 12/751 | (2013.01) |
| H04L 9/08 | (2006.01) |
| H04W 76/02 | (2009.01) |
| H04B 7/14 | (2006.01) |
| H04L 12/801 | (2013.01) |
| H04L 12/933 | (2013.01) |
| G06Q 10/08 | (2012.01) |
| H04W 4/02 | (2009.01) |
| H04L 5/00 | (2006.01) |
| H04W 4/06 | (2009.01) |
| H04L 29/06 | (2006.01) |
| H04W 12/06 | (2009.01) |
| H04W 16/18 | (2009.01) |
| H04W 52/38 | (2009.01) |
| H04W 4/00 | (2009.01) |
| H04W 24/06 | (2009.01) |
| H04W 52/02 | (2009.01) |
| H04H 20/71 | (2008.01) |
| H04W 72/12 | (2009.01) |
| H04W 88/06 | (2009.01) |
| H04W 12/04 | (2009.01) |

(52) U.S. Cl.
CPC ........... *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0817* (2013.01); *H04L 43/0852* (2013.01); *H04L 43/0882* (2013.01); *H04L 43/10* (2013.01); *H04L 45/02* (2013.01); *H04L 47/115* (2013.01); *H04L 47/16* (2013.01); *H04L 49/1584* (2013.01); *H04L 63/061* (2013.01); *H04L 63/08* (2013.01); *H04L 63/0853* (2013.01); *H04L 67/30* (2013.01); *H04L 69/22* (2013.01); *H04W 4/008* (2013.01); *H04W 4/028* (2013.01); *H04W 4/06* (2013.01); *H04W 12/06* (2013.01); *H04W 16/18* (2013.01); *H04W 24/06* (2013.01); *H04W 40/24* (2013.01); *H04W 52/0251* (2013.01); *H04W 52/38* (2013.01); *H04W 72/12* (2013.01); *H04W 76/021* (2013.01); *H04W 76/023* (2013.01); *H04W 84/18* (2013.01); *H04W 88/06* (2013.01); *H04W 12/04* (2013.01); *Y02B 60/50* (2013.01)

(58) Field of Classification Search
CPC .. H04W 72/0406; H04L 41/082; H04L 67/34; H04L 45/36
See application file for complete search history.

(56) References Cited

U.S. PATENT DOCUMENTS

| | | |
|---|---|---|
| 7,522,540 B1 | 4/2009 | Maufer |
| 7,778,270 B1 | 8/2010 | Zhang et al. |
| 7,787,427 B1 | 8/2010 | Simon et al. |
| 8,495,618 B1 | 7/2013 | Inbaraj et al. |
| 8,516,269 B1 | 8/2013 | Hamlet et al. |
| 8,681,671 B1 | 3/2014 | Hui et al. |
| 8,938,792 B2 | 1/2015 | Koeberl et al. |
| 8,953,790 B2 | 2/2015 | Qi et al. |
| 2002/0119770 A1 | 8/2002 | Twitchell |
| 2003/0037237 A1 | 2/2003 | Baldwin et al. |
| 2003/0163554 A1 | 8/2003 | Sendrowicz |
| 2003/0181203 A1 | 9/2003 | Cheshire |
| 2005/0036469 A1 | 2/2005 | Wentink |
| 2005/0113102 A1 | 5/2005 | Kwon et al. |
| 2005/0175184 A1 | 8/2005 | Grover et al. |
| 2005/0246533 A1 | 11/2005 | Gentry |
| 2005/0249137 A1 | 11/2005 | Todd et al. |
| 2006/0025180 A1 | 2/2006 | Rajkotia et al. |
| 2006/0034233 A1 | 2/2006 | Strutt et al. |
| 2006/0041653 A1 | 2/2006 | Aaron |
| 2006/0135064 A1 | 6/2006 | Cho et al. |
| 2006/0154598 A1 | 7/2006 | Rudland et al. |
| 2006/0156390 A1 | 7/2006 | Baugher |
| 2006/0209584 A1 | 9/2006 | Devadas et al. |
| 2006/0212938 A1 | 9/2006 | Suzuki |
| 2006/0245424 A1 | 11/2006 | Ramanathan et al. |
| 2006/0268742 A1 | 11/2006 | Chu et al. |
| 2006/0268749 A1 | 11/2006 | Rahman et al. |
| 2007/0097895 A1 | 5/2007 | Keshavarzian et al. |
| 2007/0105542 A1 | 5/2007 | Friedman |
| 2007/0110024 A1 | 5/2007 | Meier |
| 2007/0127421 A1 | 6/2007 | D'Amico et al. |
| 2007/0206537 A1 | 9/2007 | Cam-Winget et al. |
| 2007/0211654 A1 | 9/2007 | Kim et al. |
| 2007/0211736 A1 | 9/2007 | Sapek et al. |
| 2007/0247303 A1 | 10/2007 | Payton |
| 2007/0280137 A1 | 12/2007 | Bahr et al. |
| 2008/0013947 A1 | 1/2008 | Peloso et al. |
| 2008/0095059 A1 | 4/2008 | Chu et al. |
| 2008/0205385 A1 | 8/2008 | Zeng et al. |
| 2008/0279155 A1 | 11/2008 | Pratt, Jr. et al. |
| 2008/0291855 A1 | 11/2008 | Bata et al. |
| 2008/0292105 A1 | 11/2008 | Wan et al. |
| 2009/0067373 A1 | 3/2009 | Kneckt et al. |
| 2009/0216349 A1 | 8/2009 | Kwon et al. |
| 2009/0222659 A1 | 9/2009 | Miyabayashi et al. |
| 2009/0232037 A1 | 9/2009 | Dixit et al. |
| 2009/0274173 A1 | 11/2009 | Wentink |
| 2010/0005294 A1 | 1/2010 | Kostiainen et al. |
| 2010/0046439 A1 | 2/2010 | Chen et al. |
| 2010/0100940 A1 | 4/2010 | Reynolds |
| 2010/0141406 A1 | 6/2010 | Jo et al. |
| 2010/0149028 A1 | 6/2010 | Mermet et al. |
| 2010/0191968 A1 | 7/2010 | Patil et al. |
| 2010/0202345 A1 | 8/2010 | Jing et al. |
| 2010/0205281 A1 | 8/2010 | Porter et al. |
| 2010/0241857 A1 | 9/2010 | Okude et al. |
| 2010/0246460 A1 | 9/2010 | Kholaif et al. |
| 2010/0260146 A1 | 10/2010 | Lu |
| 2010/0262828 A1 | 10/2010 | Brown et al. |
| 2011/0053493 A1 | 3/2011 | Yanagihara |
| 2011/0081860 A1 | 4/2011 | Brown et al. |
| 2011/0099368 A1 | 4/2011 | Koh |

(56) References Cited

U.S. PATENT DOCUMENTS

| | | |
|---|---|---|
| 2011/0121654 A1 | 5/2011 | Recker et al. |
| 2011/0128884 A1 | 6/2011 | Reynaud et al. |
| 2011/0216695 A1 | 9/2011 | Orth |
| 2012/0087290 A1 | 4/2012 | Rhee et al. |
| 2012/0087292 A1 | 4/2012 | Grimm et al. |
| 2012/0163292 A1 | 6/2012 | Kneckt et al. |
| 2012/0195231 A1 | 8/2012 | Fonseca et al. |
| 2012/0196534 A1 | 8/2012 | Kasslin et al. |
| 2012/0198434 A1 | 8/2012 | Dirstine et al. |
| 2012/0198435 A1* | 8/2012 | Dirstine ............... G06F 8/65 717/173 |
| 2012/0252405 A1 | 10/2012 | Lortz et al. |
| 2012/0263072 A1 | 10/2012 | Wu |
| 2013/0016654 A1 | 1/2013 | Mayo et al. |
| 2013/0029685 A1 | 1/2013 | Moshfeghi |
| 2013/0051552 A1 | 2/2013 | Handschuh et al. |
| 2013/0064175 A1 | 3/2013 | Pandey et al. |
| 2013/0065584 A1 | 3/2013 | Lyon et al. |
| 2013/0067222 A1 | 3/2013 | Munger et al. |
| 2013/0070745 A1 | 3/2013 | Nixon et al. |
| 2013/0080765 A1 | 3/2013 | Mohanty et al. |
| 2013/0128809 A1 | 5/2013 | Wentink et al. |
| 2013/0130622 A1 | 5/2013 | Yang et al. |
| 2013/0198305 A1 | 8/2013 | Veillette |
| 2013/0215900 A1* | 8/2013 | Jogadhenu .............. H04L 67/34 370/394 |
| 2013/0219482 A1 | 8/2013 | Brandt |
| 2013/0227336 A1 | 8/2013 | Agarwal et al. |
| 2013/0242929 A1* | 9/2013 | Gorgen ................ H04L 45/36 370/329 |
| 2013/0279409 A1 | 10/2013 | Dublin, III et al. |
| 2013/0279410 A1 | 10/2013 | Dublin, III et al. |
| 2013/0301471 A1 | 11/2013 | Brown et al. |
| 2014/0025806 A1 | 1/2014 | Robitaille et al. |
| 2014/0044016 A1* | 2/2014 | Rahman .............. H04L 67/34 370/256 |
| 2014/0047260 A1 | 2/2014 | Iijima |
| 2014/0064261 A1 | 3/2014 | Wang et al. |
| 2014/0089912 A1 | 3/2014 | Wang et al. |
| 2014/0108786 A1 | 4/2014 | Kreft |
| 2014/0111234 A1 | 4/2014 | Laackmann et al. |
| 2014/0112470 A1 | 4/2014 | Shen et al. |
| 2014/0167912 A1 | 6/2014 | Snyder et al. |
| 2014/0169174 A1 | 6/2014 | Gilson |
| 2014/0189790 A1 | 7/2014 | Mindler et al. |
| 2014/0266669 A1 | 9/2014 | Fadell et al. |
| 2014/0337607 A1 | 11/2014 | Peterson et al. |
| 2015/0010153 A1 | 1/2015 | Robertson |
| 2015/0052351 A1 | 2/2015 | Nodehi et al. |
| 2015/0058409 A1 | 2/2015 | Wang |
| 2015/0143130 A1 | 5/2015 | Ducharme et al. |
| 2015/0195692 A1 | 7/2015 | Chow et al. |
| 2015/0242614 A1 | 8/2015 | Scagnol et al. |
| 2015/0244481 A1 | 8/2015 | Tyson et al. |
| 2015/0244484 A1 | 8/2015 | Tyson et al. |
| 2015/0244565 A1 | 8/2015 | Heydon et al. |
| 2015/0244623 A1 | 8/2015 | Heydon et al. |
| 2015/0244648 A1 | 8/2015 | Tyson et al. |
| 2015/0244828 A1 | 8/2015 | Heydon |
| 2015/0245179 A1 | 8/2015 | Jarvis et al. |
| 2015/0245203 A1 | 8/2015 | Tyson et al. |
| 2015/0245204 A1 | 8/2015 | Heydon |
| 2015/0245220 A1 | 8/2015 | Williamson et al. |
| 2015/0245231 A1 | 8/2015 | Jarvis et al. |
| 2015/0245296 A1 | 8/2015 | Tyson et al. |
| 2015/0245351 A1 | 8/2015 | Banerjea et al. |
| 2015/0245369 A1 | 8/2015 | Heydon |
| 2015/0245412 A1 | 8/2015 | Tyson et al. |
| 2015/0326444 A1 | 11/2015 | Smith et al. |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 4/2011 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008004102 A2 | 1/2008 |
| WO | 2008013878 A1 | 1/2008 |
| WO | 2009082151 A2 | 7/2009 |
| WO | 2009088887 A2 | 7/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A | 1/2013 |
| WO | 2013028404 A1 | 2/2013 |
| WO | 2013057666 A1 | 4/2013 |
| WO | 2014/000163 A1 | 1/2014 |

OTHER PUBLICATIONS

Search Report for DE Application 10 2014 012 518.1 mailed on Feb. 27, 2015 (14 pages).
Search Report for DE Application 10 2014 012 615.3 mailed on Jan. 27, 2015 (6 pages).
Search Report for GB Application 1405790.5 mailed on Oct. 14, 2014 (5 pages).
Search Report for GB Application 1403312.0 mailed on Jun. 25, 2014 (3 pages).
Search Report for GB Application 1405786.3 mailed on Jul. 17, 2014 (3 pages).
Search Report for GB Application 1415178.1 mailed on Sep. 25, 2014 (5 pages).
Search Report for GB Application 1405797.0 mailed on Sep. 2, 2014 (3 pages).
Search Report for GB Application 1405789.7 mailed on Sep. 26, 2014 (4 pages).
Search Report for GB Application 1405797.0 mailed on Jul. 17, 2014 (4 pages).
Search Report for GB Application 1415177.3 mailed on Sep. 10, 2014 (4 pages).
Search Report for DE Application 10 2014 012 257.3 mailed on Jan. 27, 2015 (7 pages).
Search Report for DE Application 10 2014 012 616.1 mailed on Feb. 3, 2015 (6 pages).
Search Report for GB Application 1412715.3 mailed on Jan. 8, 2015 (3 pages).
Search Report for GB Application 1412722.9 mailed on Jan. 13, 2015 (6 pages).
Search Report for GB Application 1501943.3 mailed on Mar. 20, 2015 (4 pages).
Schutz K: "Trusted Platforms for Homeland Security", Atmel white paper, Copyright 2004, pp. 1-8, http://www.atmel.com/images/doc5062.pdf.
Chiang et al., "Neighborhood-Aware Density Control in Wireless Sensor Networks," 2008 IEEE International Conferences on Sensor Networks, Ubiquitous, and Trustworthy Computing, 8 pages.
Balachandran et al., "Adaptice Sleeping and Awakening Protocol (ASAP) for Energy Efficient Adhoc Sensor Networks," 2005 IEEE, 7 pages.

* cited by examiner

UPDATE MANAGEMENT

CROSS REFERENCE TO RELATED APPLICATIONS

This non-provisional patent application claims priority to Great Britain applications: GB 1412719.5, filed Jul. 17, 2014; GB 1405790.5, filed Mar. 31, 2014; GB 1403314.6, filed Feb. 25, 2014; GB 1405785.5, filed Mar. 31, 2014; GB 1405786.3, filed Mar. 31, 2014; GB 1405789.7, filed Mar. 31, 2014; GB 1403312.0, filed Feb. 25, 2014; GB 1405791.3, filed Mar. 31, 2014; GB 1405797.0, filed Mar. 31, 2014.

TECHNICAL FIELD

This invention relates to a system and method for updating data at a node in a mesh network.

BACKGROUND OF THE INVENTION

Wireless mesh networks are an example of an ad hoc network in which each device can relay data on behalf of other devices in the network. A pair of devices in a mesh network might not be able to communicate directly with one another. Instead, communications between the pair of devices can be supported by one or more other devices in the mesh network which act to relay data from one device of the pair to the other. In such mesh networks, a connection between a given pair of devices can be intermittent and short-lived due to intermediate devices supporting the connection moving in and out of the signal range of adjacent devices, interference, and those intermediate devices entering low power states.

These issues are compounded when the device wishing to communicate over the wireless mesh network is itself subject to power restrictions. Such devices, which can include ultra-low power devices intended to run for many years on a single battery, may themselves spend a significant proportion of time in a low power state in which communication is not possible or in which the device is configured to respond only to certain network packets (e.g. those for which it is the endpoint). Low power devices may only achieve sporadic connectivity to resources in the network, which can make it difficult for those devices to perform functions that are typically enabled by network connectivity, such as downloading software updates and performing data backups to a remote location.

Enabling devices to update their software can allow the function set of a device to be changed without requiring that the physical device is replaced. For example, a software update can provide new functionalities and bug fixes to a device. This can be advantageous even for the most low-power devices.

Devices in mesh networks often present difficulties to the usual approaches for performing software updates. For example, nodes in mesh networks can suffer from unreliable connections and are limited by the small size of data packets typically transported over the network. These difficulties generally include the problems discussed above for low power devices suffering from intermittent connectivity to a mesh network. Software updates can be a particular problem when the mesh network represents an "Internet of Things" because devices on such mesh networks can be inaccessible to a user (such as a light controller embedded in a wall) and may often not present any kind of interface accessible to the user (preventing actions such as a physical reset).

There is a need for a robust update mechanism for devices operating in mesh networks which allows very low power devices with potentially intermittent access to the network to be reliably updated.

BRIEF SUMMARY OF THE INVENTION

According to a first aspect of the present invention there is provided a method for providing an update package to a node in a mesh network comprising a set of nodes and a gateway node arranged to provide access to an update server by means of a second network, the method comprising: the gateway node collecting data package information from each of the set of nodes including a first node, each data package information instance identifying a respective node and its data package version; using the data package information, the gateway node querying the update server by means of the second network so as to cause the update server to respond to the gateway node with an updated data package for at least the first node; the gateway node broadcasting the updated data package into the mesh network as a sequence of first mesh messages carrying an identifier of the first node; and on receiving a first mesh message: each of a first plurality of nodes of the set, including the first node, scheduling one or more operations to forward the first mesh message to other nodes of the set; and the first node additionally storing the first mesh message so as to, as the sequence of first mesh messages is received, assemble the updated data package.

The gateway node may broadcast each of the sequence of first mesh messages into the mesh network more than once.

The gateway node may periodically broadcast each the sequence of first mesh messages into the mesh network for a predetermined period of time.

The gateway node may collect data package information from the first node by broadcasting an information request into the mesh network and in response receiving the data package information from the first node.

The gateway node may collect data package information from the first node by receiving the data package information as an unsolicited broadcast by the first node into the mesh network.

The data package information may indicate the type of each node in the set and, on collecting the data package information, the gateway node may: identifying a plurality of nodes of the set of the same type; defining a first group identifier for that plurality of nodes; and broadcasting the first group identifier into the mesh network such that each of the plurality of nodes becomes associated with the first group identifier.

The plurality of nodes may include the first node and the sequence of first mesh messages may represent the updated data package each including the first group identifier as the identifier of the first node.

The method may further comprise a second plurality of nodes of the set caching mesh messages and, on the first node identifying a missing message in the sequence of first mesh messages it has received, the first node may broadcast a missing message request into the mesh network so as to cause one of the second plurality of nodes of the set to respond with a cached copy of the missing message.

Each first mesh message may include a first parameter representing a first time period for which that first mesh message is to persist in the mesh network, and each of the second plurality of nodes may discard a first mesh message from it cache once the first time period is determined to have elapsed for that message.

The first parameter may indicate one or more of: a time when the respective message expires; a period of time as measured from a timestamp of the respective message; a remaining period of time for which the respective message is to persist from its time of reception at a node.

The first node may, on receiving a first mesh message, not transmit to the gateway node a message acknowledging receipt of the mesh message.

The set of nodes of the mesh network may authenticate received mesh messages using a security key common to the nodes of the mesh network.

The method may further comprise, on completing assembly of the updated data package, the first node entering an update mode and applying the updated data package.

Prior to entering its update mode, the first node may verify the updated data package using a checksum received with the updated data package.

The gateway node may broadcast the sequence of first mesh messages into the mesh network at a rate calculated in dependence on: an amount of storage available in the mesh network for caching mesh messages; and a first time period for which each first mesh message is to persist in the network.

The updated data package may comprise one or more of firmware for the first node, configuration information for the first node, operating parameters for the first node, a dataset for use at the first node, and code for execution at the first node.

According to a second aspect of the present invention there is provided a system for providing an update package to a node in a mesh network, the system comprising: a set of nodes of the mesh network, the set including a first node and a gateway node; the gateway node being operable to communicate over a second network and to collect data package information from each of the set of nodes, each data package information instance identifying a respective node and its data package version; and an update server accessible over the second network; the gateway node being configured to: using the data package information, query the update server by means of the second network so as to cause the update server to respond to the gateway node with an updated data package for at least the first node; and broadcast the updated data package into the mesh network as a sequence of first mesh messages carrying an identifier of the first node; and on receiving a first mesh message: each of a first plurality of nodes of the set, including the first node, scheduling one or more operations to forward the first mesh message to other nodes of the set; and the first node additionally storing the first mesh message so as to, as the sequence of first mesh messages is received, assemble the updated data package.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is provided a system for updating data at a node in a mesh network, such as the firmware of the node, its application-ware or its configuration. The system is described herein by way of example with reference to the Bluetooth Smart mesh network in which nodes are referred to as "Things". The second network could be any kind of network, including a wired or wireless network. In the examples described herein the second network provides access to the internet. The gateway or "hub" could be any suitable device operable to span the two networks, including a personal computer running appropriate software, an internet router, a smartphone or tablet, or any kind of network-enabled appliance such as a television, refrigerator or washing machine.

Figure 1:
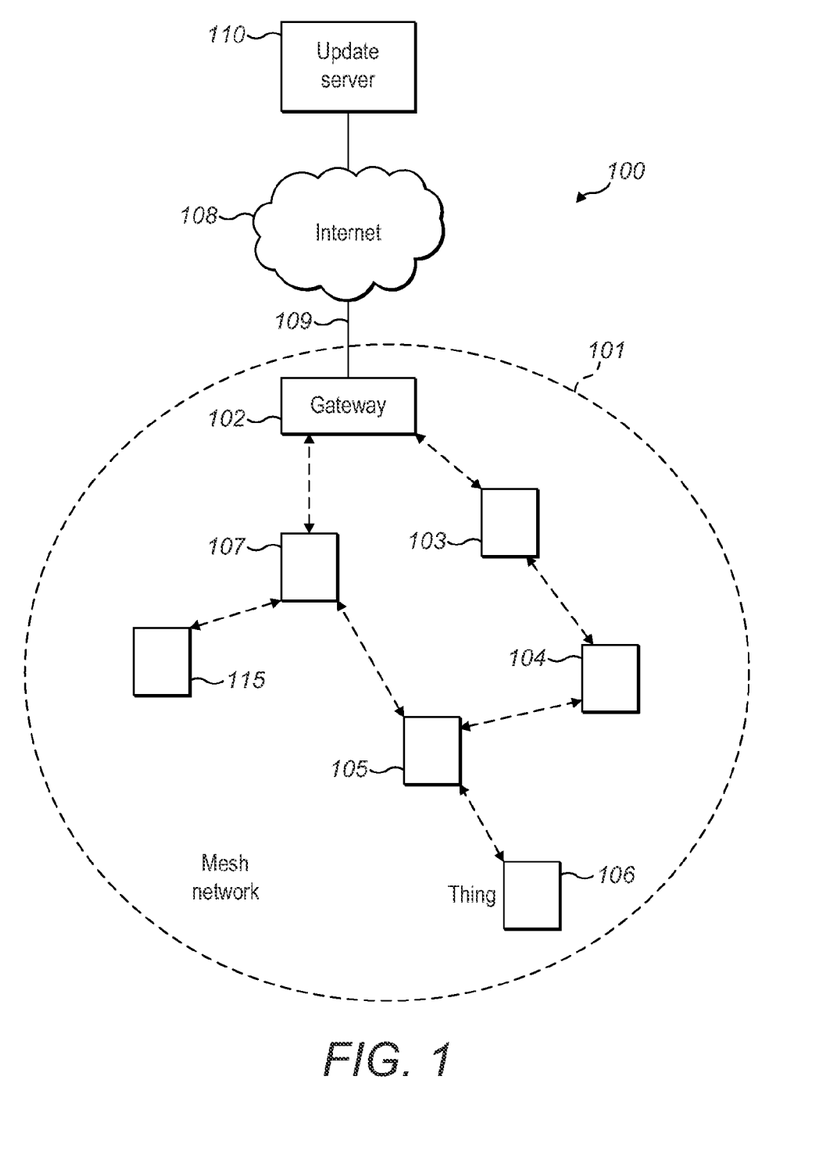
FIG. 1 is a schematic diagram illustrating a system for updating a node in a wireless network.

FIG. 1 is a schematic diagram illustrating a system 100 for updating a node in a mesh network. The system includes a wireless mesh network 101 comprising a set of nodes 102, 103, 104, 105, 106, 107 and 115. These nodes are operable to communicate with one another by means of Bluetooth Low Energy. The range over which each node can communicate may be limited, for example, by their available power, interference affecting the communication channel(s) used, and the physical environment in which the nodes operate. Nodes having limited power may reduce the amount of time for which they listen for mesh messages/are available to receive mesh messages. Thus, in the snapshot of network 101 shown in FIG. 1, node 107 can communicate directly with nodes 102, 105 and 115, but it cannot communicate directly with node 106. Data exchanged between nodes 106 and 107 over the mesh network may be relayed via at least one intermediate node, such as via node 105. In this example, node 106 can only communicate directly with node 105 and any communications with node 106 over the mesh may therefore be relayed by node 105. The nodes directly accessible to any given node in the mesh network is likely to change over time as adjacent nodes move in and out of range of one another, as nodes enter low power states, and when the physical or radio environment of the nodes changes. The mesh network 101 could have any suitable topology.

In FIG. 1, node 102 is a gateway device and nodes 103-107 and 115 are "Things", which could be consumer devices around the home. For example, Thing 106 could be a lightbulb coupled with Bluetooth Low Energy (BLE) connectivity so as to allow the lightbulb to be controlled (e.g. in terms of its colour, luminosity) over the mesh network. Things 103-105 could be devices such as a refrigerator, light switch, dustbin, door entry pad, thermostat etc. which are similarly equipped with Bluetooth Low Energy connectivity. Gateway device 102 is configured to operate both on the mesh network 101 and on a second network 108, which in this case is the internet. For example, the gateway device could be a smartphone equipped with BLE connectivity and connectivity to the internet could be by means of its integrated cellular modem or an IEEE 802.11 radio to allow the smartphone to establish a WiFi connection 109 (e.g. to an internet-connected router, not shown in FIG. 1). In other examples, connectivity to the second network could be provided in accordance with any other communication protocol. In another example, the gateway device could be a WiFi-enabled appliance such as a refrigerator or television which is also equipped with BLE connectivity adapted for connection to mesh network 101. A mesh network can include more than one gateway device.

Gateway device 102 may be any of a variety of different types of devices (e.g, it may be a dedicated gateway device for a mesh network and not provide any further functionality). Typically, however, gateway device 102 may not be subject to severe power restrictions—for example, it could be mains-powered (such as an internet router or refrigerator), or it might be a portable device such as a smartphone, tablet or laptop which is frequently recharged by the user. At least some of the nodes could be ultra-low power devices. For example, node 115 could be a battery-powered dustbin sensor arranged to run on the same battery for many years and configured to transmit an indication to a local council indicating when the bin is full and needs emptying. The dustbin sensor would transmit its "bin full" indication into the mesh network for communication to the gateway 102 which provides access to the internet 108 for the mesh network. In this case, node 107 is in the range of BLE transmissions of the dustbin and would first receive the mesh message carrying the "bin full" indication. Node 107 would then propagate that message onto gateway 102. Since the "bin full" indication would be directed to a local council server accessible over internet 108, the gateway device 102 would forward the indication over link 109 to the internet.

Other Things on the mesh network 101 might have different power restrictions—for example they could be solar powered, or only receive power when the device is used (e.g. an occasionally-used kitchen appliance).

System 100 further comprises an update server 110 which is arranged to provide update packages for nodes of the mesh network. The update server could provide a "cloud service" so as to allow a node to receive updates by means of the internet 108. More generally, the update server could be accessible over any kind of network to which the gateway device has access, including a home or business network to which update server 110 is connected. An update package available at server 110 for a node could be firmware for the node, the firmware potentially being, for example, a new firmware version, replacement firmware for a current version, or an old firmware version (e.g. where rollback of node firmware is required).

Firmware can be any kind of code for execution at the node including, for example, application-ware (e.g. custom application code for execution at the node in an execution context provided by lower-level firmware) and low-level firmware (e.g. a kernel providing basic node functionality, such as radio communications and defining a software environment in which application-ware can be executed). An update package could alternatively or additionally include configuration information for the node (e.g. a saved configuration for a light switch thing), operating parameters for the node (e.g. calibration parameters for a thermostat thing), a dataset for use at the node (e.g. an encrypted list of allowed entry codes for a door entry pad), and code for execution at the node (e.g. an application for execution at a refrigerator to provide a diary information on its display screen).

A first example will now be described with reference to FIG. 2, which shows a possible flow of messages between the elements of the system of FIG. 1. In this example, mesh network 101 is a network of consumer devices in a home, Thing 106 is a lightbulb and the gateway 102 is a laptop with BLE and WiFi functionality which can execute software configured to cause the laptop to operate as a gateway device for BLE mesh network 101. The software could be configured to periodically run as a service at the laptop in order to perform the update mechanism described below. The WiFi functionality of the laptop allows the laptop to communicate over internet 108 by means of an internet router (not shown in FIG. 1).

Lightbulb 106 operates according to firmware stored at the thing and adapted for execution at a processor 210 (typically a low power system-on-chip processor). The firmware defines various functions associated with the operation of the lightbulb (e.g. routines for turning on and off the light, controlling its colour temperature etc.) and the operation of the Thing as a node within BLE mesh network 101 (e.g. routines defining BLE messaging protocols, performing firmware updates). In this example, the firmware is provided in two parts: low level firmware 203 which defines a software environment, and higher-level application-ware (or "appware") 201 for running in that software environment. In the present example it is the appware which is updated, but more generally it could be any aspect of the firmware or data held at Thing 106. The appware includes routines for controlling the operation of the lightbulb, such as routines for turning on and off its light source according to a defined schedule, and routines for controlling the colour temperature of the lightbulb. Lightbulb thing 106 is provided with a Bluetooth radio 212 by means of which the thing communicates over mesh network.

Gateway device 102 is in this example a laptop comprising a memory 206 and a CPU 211. Laptop 102 supports an update agent 207 which is software configured to perform aspects of the update mechanism described herein so as to update the appware at Thing 106. Laptop 102 comprises a Bluetooth radio 213 by means of which it communicates over BLE mesh network 101, and a WiFi radio 214 by means of which it communicates over the internet 108. The gateway device functionality, including update agent 207 and the necessary routines to cause the laptop to behave as a gateway device in mesh network 101, can be provided at the laptop as software running at the CPU 211.

Update server 110 is in this example a cloud server accessible over the internet 108 and comprising a processor 215, memory 216 and a network interface 217 adapted to couple the server to the internet. Server 110 includes an update manager 218 for supporting communications with update agent 207 at mesh network 101. The update manager would typically be software running at processor 215. Two data stores are supported at or accessible to the server: a device registry 208 and a package repository 209. In other examples, the server could support one or more data stores collectively storing data packages and information identifying the devices or device types to which each data package relates.

Device registry 208 comprises identifiers for the things at mesh network 101, with each identifier being a unique string and/or key set at the thing during manufacture (in practice, each identifier may be an identifier of the BLE chip provided at a thing so as to permit that thing to operate in a mesh network, and the identifier may be set during manufacture of the BLE chip). The identifier could be a Bluetooth UUID and public key. Package repository 209 comprises firmware packages for one or more things in the mesh network, along with data indicating the target hardware for each firmware package (e.g. an identifier of the chip type to which the firmware relates). The package repository could be kept up to date by the manufacturers of the things such that new firmware can be made available at the repository when it is released by the manufacturer. The device registry can be maintained by the entity generating the unique identifiers for the things, e.g. the manufacturer of the BLE chip might post new identifiers and/or keys into the registry as new chips are manufactured and identifiers allocated to them.

Figure 2:
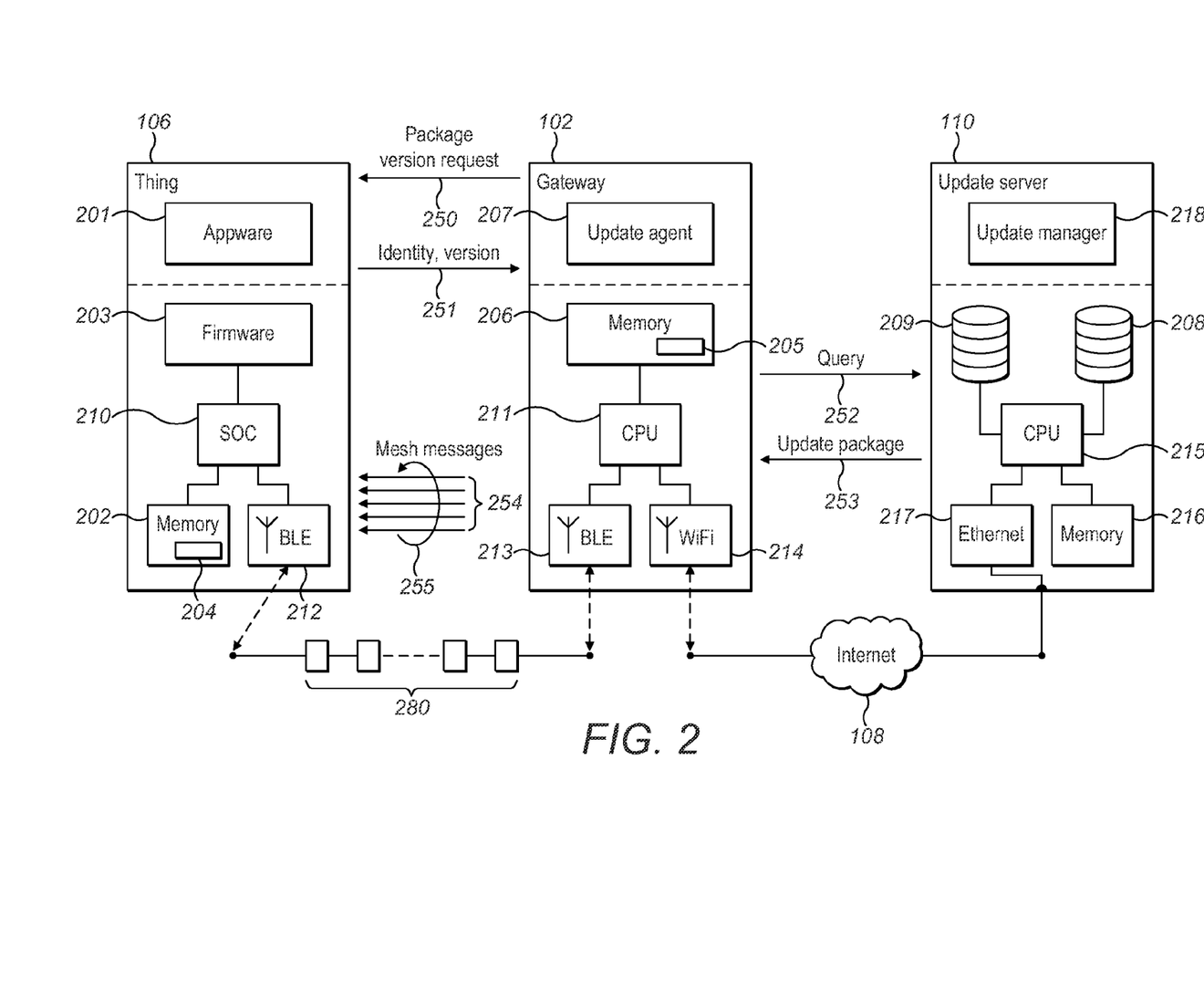
FIG. 2 illustrates a system and message flow for distributing an update package within an exemplary system.

It is to be understood that the representations of the thing, gateway device and server in FIG. 2 are merely schematic. For example, server 110 might in fact represent one or more servers operating together (e.g. a federation of servers), and the device registry and package repository could be provided as a single entity.

Laptop 102 is unlikely to be permanently powered and running in the home in which mesh network 101 is provided. Furthermore, the software at laptop 102 for providing the gateway functionality may not always be running when the laptop is powered—for example, the software may only run periodically as a service, or may only run when the user chooses to load the software and access the mesh network (e.g. to configure a schedule for turning a light source at lightbulb 106 on and off). This may mean the mesh network is provided with only sporadic access to the internet by means of the gateway device. There could be more than one gateway operating in the local network (e.g. more laptop 102 and a smartphone running appropriate software).

At least some of the nodes in the mesh network may be able to (though may not always be configured to) forward messages that are directed to other node(s) in the mesh through the scheduling of mesh messages broadcasts. Such forward operations could be scheduled periodically (e.g. to cause the node to periodically re-broadcast a mesh message) or at particular times when other nodes are known to be listening. The scheduling of a mesh message forwarding operation need not be for a particular future time; it could instead be in response to a condition of the mesh network being satisfied, e.g. a node becoming available on the network (a node could indicate its availability by broadcasting a suitable mesh message), or in response to a message being received from another node. This allows messages to reach nodes which, when those messages started out, were not at that instant accessible over the mesh network. In other words, messages can permeate through the mesh network even when a complete data path is not available at that instant from message source to endpoint, with the messages passing between nodes as and when communication becomes possible between those nodes. Broadcast messages can carry expiry information such that those messages are passed about the mesh network for some defined period of time, but after that period of time are discarded. In this manner, messages can persist for sufficient time in the mesh for the intended endpoint of a message to receive it. Security can be enforced in the mesh through the use of a common security key: in order to join the mesh network each node can be provided with the security key. The key could be used to encrypt/decrypt mesh messages.

This will now be illustrated by way of example with respect to FIG. 1. Consider that lightbulb 106 wants to send a mesh message to gateway 102. The lightbulb broadcasts that mesh message into the mesh, with the mesh message carrying an identifier of the gateway so as to allow nodes receiving the message to determine whether the message is intended for it or another node. In this case, node 105 is first to receive the mesh message. Since the message is not for node 105, the node schedules an operation to re-broadcast it into the mesh network—in this case onto nodes 107, 104 and 106, which may not be immediately available. Node 105 could be configured to provide its cached copies of mesh messages to nodes 104, 106 and 107 when they are next available in the mesh. In turn, node 107 schedules an operation to re-broadcast the message onto node 115 and gateway 102. This scheduling of re-broadcasts of a received message can be referred to as "forwarding" or "cache and forward" since some caching of the received message is generally performed. Node 115 is an ultra low power device configured to not cache and forward messages; since the mesh message is not directed to node 115 it therefore discards the message. Gateway 102, however, recognises that the mesh message is intended for it and accepts the message without caching and forwarding (unless the message is also intended for other nodes, e.g. a group of nodes to which the gateway belongs). Gateway 102 may also receive a copy of the message via nodes 104 and 103. The later-received copy can be discarded by the gateway. The gateway could broadcast an acknowledgement into the mesh indicating that it has received the message. That acknowledgement can similarly permeate through the mesh and can serve two purposes: firstly, it can indicate to the lightbulb that the message has been received; and secondly, it can indicate to the other nodes in the mesh that the cached copy of the original message from lightbulb 106 can be discarded.

It will be appreciated that as a result of changes in connectivity within the mesh network, lightbulb 106 may only be able to sporadically access the gateway device and hence internet 108. Such accesses may be short-lived and, to cope with potentially severe energy restrictions at the lightbulb, may be performed at very low power. It is however desirable for even low power things in a mesh network to be able to automatically receive firmware updates. This allows those things to be provided with new or updated functionalities and bugs to be fixed without requiring that the hardware itself is replaced. A low power, opportunistic mechanism is required by which things such as lightbulb 106 can update their firmware or other data.

FIG. 2 sets out a mechanism by which lightbulb 106 can update its firmware by means of mesh network 101. Gateway 102 is configured to broadcast a package version request 250 into the mesh 101 so as to cause the nodes in the mesh to respond with information defining their identity and data package version. As discussed, data package version information could be a firmware version, application-ware or "appware" version, current configuration version information etc. In the present example, lightbulb 106 broadcasts its response 251 into the mesh which carries an identifier of the lightbulb (e,g, its manufacturer and model number, or its unique Bluetooth ID) and the current version of its appware. The gateway could receive any kind of identifier for the thing on the basis of which it can identify an appropriate update package for the thing at server 110. For example, the identifier could be an identifier of the type of device and its current firmware but not be unique to the device. A node may be configured to respond to a package version request only if it is in a position to update its firmware, for example if its battery charge exceeds some predefined level.

In alternative examples, lightbulb 106 is configured to from time to time broadcast a mesh message carrying its identity and appware version into the mesh network without being solicited by gateway 102.

As a gateway device, node 102 collects the responses from the nodes in the mesh, including response 251 from lightbulb 106. Armed with the appware version of thing 106 and its identity, update agent 207 of gateway 102 can then proceed to query update server 110 by means of the internet and it's WiFi radio 214. This query can be performed at any convenient point, e.g. the next time gateway device 102 achieves a connection to the internet, or when a user of the gateway device chooses to check for updates for things at the mesh network. Update agent 207 queries the update manager 218 operating at the update server by transmitting query message 252 which carries information identifying thing 106 and its appware version.

On receiving the query 252, the update manager consults device registry 208 using the information identifying thing 106 (e.g. its model number) and its current appware version in order to identify whether updated appware is available for the lightbulb. In this case updated appware v1.3 is available for the lightbulb and is retrieved from package repository 209 and transmitted in data packet(s) 253 by the update manager 218 to gateway 102. The update package could be encoded so as to ensure the update is used only by the intended thing 106—for example, the update package could be encrypted using a public key of thing 106 known to the device registry. Gateway device 102 stores the firmware package at its memory 206. The update package could also be signed by the update server with the private key of an asymmetric keyset associated with the server. The public key of the server can be provided to the mesh network and hence known to the mesh node and/or the gateway so that the source of the update package can be verified at the gateway before it is broadcast into the mesh and/or by the node before the update is applied. This can avoid the injection of rogue updates into the mesh.

By arranging that the gateway discovers the firmware on behalf of the thing and then downloads (and potentially verifies the signature of) that firmware, the gateway can perform these energy-intensive operations which require a reliable connection to the update server. Given the small message size typically used in mesh network 101, in order to pass the downloaded firmware to the thing, the gateway performs segmentation of the update package into a sequence of mesh messages. These messages are broadcast into the mesh according to the mesh network protocols such that the lightbulb can build up (potentially over some time) the update package from the data segments. One or more of the mesh messages may include a checksum or other means for verifying the integrity of the received update package.

If updated firmware is not available, the update manager indicates this to the gateway device. Preferably the update agent at the gateway device does not transmit this information into the mesh network 101 so as to avoid causing the mesh nodes to expend unnecessary energy receiving and parsing that information.

Update packages received at the gateway are stored at the gateway's package cache 205 so as to allow subsequent dissemination of the update package data without requiring the gateway to maintain a connection to the update server. Once the gateway holds the update package for lightbulb 106, it can begin to communicate the update package to the lightbulb by broadcasting the update package as a sequence of mesh messages 254 into the mesh network 101. Due to the small size of mesh messages, typically an update package may be segmented by the gateway into many small mesh messages, each carrying a portion of the update package in their payload data. This segmentation could be performed at the gateway or at the server. If it is performed at the server, the gateway could be configured to push into the mesh (possibly with minor protocol processing, such as inserting sequence numbers into the messages) mesh messages carried in the payload of data packets received from the server (e.g. TCP/IP or UDP data packets).

Each mesh message of the sequence includes an identifier of lightbulb 106. This could be an identifier specific to the lightbulb, such as its Bluetooth ID, or a group identifier for a group to which the lightbulb belongs. The identifier need not be used to route the mesh message since the mesh network may employ very limited message routing, but the identifier does allow the lightbulb to identify when it receives a mesh message which is directed to it.

It is advantageous if the node(s) to which an update mesh message is intended additionally forward the message onto other nodes of the mesh network. This helps ensure that the sequence of mesh messages reach all parts of the mesh network and allows the same mesh messages to be used to update multiple nodes of the mesh network.

The gateway can be configured to define groups of nodes on collecting responses 251 from the nodes of the mesh network which carry the identity and version information of the nodes. On identifying more than one node being of the same type and having the same package version (e.g. the same appware version), the gateway could define a group for those nodes and cause those nodes to be associated with the group. The gateway could, for example, broadcast a mesh message into the mesh indicating to those nodes that they belong to the group and should therefore be responsive to mesh messages directed to that group. For example, nodes 104, 105 and 106 could all be lightbulbs of the same model and having the same appware version, with gateway 102 defining a group "lightbulb_1". Since in many cases all of the lightbulbs would receive the same update package, allowing the gateway to address an update package to all of the bulbs of the group minimises the amount of data injected into the mesh network and hence the amount of work nodes of the network (which may be very low power devices) do in relaying update messages around the network to their intended destination.

As indicated by arrow 255 in FIG. 2, gateway 102 preferably broadcasts into the mesh each of the sequence of mesh messages carrying the update package for node 106 more than once. The gateway could be configured to start broadcasting subsequent messages in the sequence into the mesh before it has completed broadcasting the current mesh message. This can increase the likelihood that the mesh messages reach their lightbulb. For example, each mesh message could be periodically pushed into the mesh network at some predefined interval for some predefined time or until an acknowledgement for that message is sent through the mesh from the lightbulb, with the gateway then moving onto the next mesh message and periodically pushing that message into the mesh. The lightbulb need not however acknowledge the messages it receives carrying its package update. This minimises energy expenditure at the lightbulb.

The gateway could be configured to transmit the sequence of mesh messages carrying an update package at a rate which depends on the total memory available at the nodes of the mesh network for caching mesh messages. This can help the gateway to avoid flooding the mesh network which push earlier messages out of the caches at the nodes before those messages have reached their intended destination. For example, the gateway could be configured to receive in messages 251 information about the memory available for caching mesh messages (since not all of the nodes necessarily choose to cache messages, the memory available might be less than the total memory capacity of the mesh network). Based on an expectation as to how long messages take to find their intended destination, the gateway could then determine the rate at which the sequence of messages should be pushed into the mesh network and/or the period according to which the broadcast of messages of the sequence should be repeated.

The sequence of mesh messages may travel via multiple nodes of the mesh network and on a variety of paths in order to reach lightbulb 106 from the gateway. This is indicated by the set of nodes 280 in FIG. 2. For example, sometimes the lightbulb 106 might receive messages in the sequence carrying the update package by means of nodes 103, 104 and 105 (see FIG. 1), and at other times the lightbulb might receive messages via nodes 107 and 105, with from time-to-time further paths being possible involving other nodes which are not shown in FIG. 1. At least some of the nodes in the mesh network are configured to cache and forward mesh messages which are not directed to that node. In this manner, nodes other than node 106 may (a) forward messages of the sequence to adjacent nodes and (b) cache messages of the sequence for transmission to nodes which subsequently enter communication range and/or request the cached message. This allows the messages to reliably propagate through the mesh and reach nodes which might be some distance from the gateway and only intermittently accessible via multiple intermediate nodes operating as message relays. Typically a node may cache a message for a length of time indicated in the message for which the message is to persist, or until the node runs out of storage and receives younger messages.

On receiving a mesh message directed to it (as determined from the identifier carried in each message), the lightbulb 106 may store that portion of the update package carried in the message for assembly into the complete update package. In the example shown in FIG. 2, the lightbulb stores each received update package portion (potentially after processing steps such as decompression or decryption) in a memory area 204 with an offset representing the position in the update package of the update package data portion. The sequence number or other data of the mesh message carrying that update package portion could indicate the offset of the update package portion. For example, each mesh message might carry a payload of, say, 16 bytes of compressed data and, in a header of the mesh message, data indicating the offset of the uncompressed payload data in the completed update package. The uncompressed payload of each mesh message in the sequence can then be stored at its indicated offset in memory area 204 such that, once all mesh messages making up the sequence carrying the update package have been received, the memory area 204 would hold the complete update package.

The mesh messages could comprise header information or other data identifying each mesh message of the sequence as being a mesh message carrying an update package.

This allows the lightbulb to distinguish received mesh messages that carry a portion of the update package from mesh message carrying other data.

Once the lightbulb has received all of the messages of the sequence and the complete data package is available, the lightbulb preferably verifies the integrity and, optionally, the signature of the downloaded data package. For example, the lightbulb could perform a checksum over the received data of the data package and compare that checksum to a checksum provided with the mesh messages. If the updated data package is successfully verified, the lightbulb enters its update mode, applies the updated appware and reboots.

On verifying the updated package, the lightbulb could broadcast an acknowledgement onto the mesh network directed to the gateway so as to inform the gateway that the update package has been successfully received; the gateway could then delete the package from its memory (or if the lightbulb belongs to a group, when the gateway has received an acknowledgement from all of the nodes of the group). In some embodiments, however, the lightbulb may not broadcast acknowledgements of successfully received messages or of the complete data package.

A node being updated (in this case lightbulb 106) may be configured to broadcast a missing message request when it determines that a message is missing from the sequence. For example, the missing message request could be triggered when the lightbulb receives a subsequent mesh message in the update sequence when it has not yet received an earlier mesh message in the sequence. It will be appreciated that many other trigger configurations are possible. The missing message request is broadcast into the mesh so as to cause any other node which has cached a copy of the missing message to transmit the missing message to the lightbulb. The missing message request is not directed to the gateway, although the gateway could potentially receive the request and respond with a copy of the missing message. This mechanism allows the collective memory of nodes in the mesh to fill any holes in the update package assembled by the lightbulb.

Since the lightbulb might belong to a group such that there are other nodes receiving the same update package, it can be advantageous for the lightbulb to both store the payload of each received mesh message in memory area 204 in which it is assembling the update package as well as caching a copy of the original mesh message such that it can respond to missing message requests received from other nodes of the group.

The broadcasting of messages in mesh networks should not be understood to require that messages are explicitly addressed to all nodes of the network; broadcasting messages in a mesh network makes those messages available to any node of the mesh which is listening so as to allow those messages to potentially reach all nodes of the network.

The thing, gateway, and server/database of FIG. 2 are shown as comprising a number of functional blocks. This is schematic only and is not intended to define a strict division between different logic elements. Each functional block can be provided in any suitable manner, including as discrete hardware or software entities, and as a single hardware entity/as a collection of software entities running at a processor. For example, the radio, processor and memory of the thing may be provided in a single integrated circuit running one or more firmwares adapted to provide the functionalities described herein.

The terms software and program code as used herein includes executable code for processors (e.g. CPUs and/or GPUs), firmware, bytecode, programming language code such as C, and modules for reconfigurable logic devices such as FPGAs.

The algorithms and methods described herein could be performed by one or more physical processing units executing software that causes the unit(s) to perform the algorithms/methods. Each physical processing unit could be any suitable processor, such as a CPU or GPU (or a core thereof), or fixed function or programmable hardware. The software could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for providing an update package to a node in a mesh network comprising a set of nodes and a gateway node arranged to provide access to an update server via a second network, the method comprising:
receiving a data package information instance from each node of the set of nodes, each data package information instance identifying its respective node and a data package version of its respective node;
querying, using each data package information instance, the update server;
receiving an updated data package corresponding to the data package information instance in response to the query; and
broadcasting the updated data package into the mesh network as a sequence of mesh messages, each mesh message in the sequence carrying an identifier of its respective node, the sequence of mesh messages broadcast at a rate that is based at least in part on a total memory available from the set of nodes.

2. The method of claim 1, further comprising:
periodically broadcasting each sequence of mesh messages into the mesh network, each broadcast occurring over a predetermined period of time, wherein the predetermined period of time is based on the total memory available from the set of nodes.

3. The method of claim 1, further comprising:
broadcasting an information request into the mesh network to obtain the data package information instance from each of the one or more nodes.

4. The method as claimed in claim 1, further comprising:
receiving each data package information instance as an unsolicited broadcast by each of the one or more nodes into the mesh network.

5. The method as claimed in claim 1, further comprising:
identifying a first plurality of nodes of the set of a same type, wherein each data package information instance indicates a type of its respective node;
defining a first group identifier for that first plurality of nodes; and
broadcasting the first group identifier into the mesh network such that each of the first plurality of nodes becomes associated with the first group identifier.

6. The method as claimed in claim 5, wherein each sequence of mesh messages represents an updated data package, and one or more of the sequences of mesh messages includes the first group identifier as the identifier of its respective node.

7. The method as claimed in claim 1, the gateway node broadcasting the sequence of mesh messages into the mesh network at a rate calculated in dependence on:
an amount of storage available in the mesh network for caching mesh messages; and
a first time period for which each mesh message is to persist in the network.

8. The method of claim 1, the updated data package comprising one or more of firmware for one or more nodes, configuration information for the one or more nodes, operating parameters for one or more nodes, a dataset for use at one or more nodes, and code for execution at one or more nodes.

9. A system for providing an update package to a node in a mesh network, the system comprising:
a set of nodes of the mesh network, the set including a gateway node and a first plurality of nodes, the first plurality of nodes including at least a first node;
the gateway node being operable to communicate over a second network and to collect data package information from each node of the set of nodes, each data package information instance identifying a respective node and its data package version; and
an update server accessible over the second network;
the gateway node being configured to:
using the data package information, query the update server via the second network so as to cause the update server to respond to the gateway node with an updated data package for the first node; and
broadcast the updated data package into the mesh network as a sequence of mesh messages carrying an identifier of the first node, the sequence of mesh messages broadcast at a rate that is based at least in part on a total memory available from the set of nodes;
and on receiving a mesh message of the sequence of mesh messages:
each of the first plurality of nodes is to schedule one or more operations to forward the mesh message to other nodes of the set of nodes; and
the first node is to store the mesh message so as to, as the sequence of mesh messages is received, assemble the updated data package.

10. The system of claim 9, wherein the mesh messages in the sequence of mesh messages are forwarded from each node in the set of nodes to one or more other nodes of the set of nodes based at least in part on respective identifiers of the mesh messages.

11. The system of claim 9, wherein each of the plurality of nodes of the set, on receiving a mesh message of the sequence of mesh messages, does not transmit a message to the gateway node acknowledging receipt of the mesh message.

12. The system of claim 9, wherein the first node, after assembling the updated data package, enters an update mode, and applies the updated data package.

13. The system of claim 9, further comprising a second plurality of nodes of the set of nodes, the second plurality of nodes configured to cache mesh messages of the sequence of mesh messages; and
wherein in response to a node in the set of nodes broadcasting a missing message request into the mesh network, one of the second plurality of nodes is to respond with a cached copy of a missing mesh message corresponding to the missing message request.

14. The system of claim 13, wherein each mesh message includes a first parameter representing a first time period for which that mesh message is to persist in the mesh network; and
wherein each node in the second plurality of nodes is to discard a mesh message from its cache when the first time period has elapsed for that mesh message.

15. The system of claim 14, wherein the first parameter indicates one or more of: a time when the respective message expires; a period of time measured from a timestamp of the respective message; and a remaining period of time for which the respective message is to persist from its time of reception at a node.

16. A gateway node for providing an update package to a node in a mesh network, and providing access to an update server via a second network, the mesh network comprising a set of nodes and the gateway node, the gateway node configured to:
- receive a data package information instance from each node of the set of nodes, each data package information instance identifying its respective node and a data package version of its respective node;
- query the update server using each data package information instance;
- receive an updated data package corresponding to the data package information instance in response to the query; and
- broadcast the received updated package into the mesh network as a sequence of mesh messages, each mesh message in the sequence carrying an identifier of its respective node, the sequence of mesh message broadcast at a rate that is based at least in part on a total memory available from the set of nodes.

* * * * *